US010581890B2

(12) United States Patent
Antony

(10) Patent No.: US 10,581,890 B2
(45) Date of Patent: Mar. 3, 2020

(54) CONTAINER DATA OFFLINE AND ONLINE SCAN IN A CLOUD ENVIRONMENT

(71) Applicant: VMware, Inc., Palo Alto, CA (US)

(72) Inventor: Jinto Antony, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/967,494

(22) Filed: Apr. 30, 2018

(65) Prior Publication Data

US 2018/0255087 A1 Sep. 6, 2018

Related U.S. Application Data

(63) Continuation of application No. 14/828,549, filed on Aug. 18, 2015, now Pat. No. 9,961,098.

(51) Int. Cl.
*G06F 21/50* (2013.01)
*G06F 21/56* (2013.01)
*H04L 29/06* (2006.01)
*G06F 9/455* (2018.01)
*G06F 21/00* (2013.01)
*G06F 21/53* (2013.01)

(52) U.S. Cl.
CPC ...... *H04L 63/1425* (2013.01); *G06F 9/45558* (2013.01); *G06F 21/00* (2013.01); *G06F 21/53* (2013.01); *G06F 21/566* (2013.01); *G06F 2009/45587* (2013.01)

(58) Field of Classification Search
CPC ........... G06F 21/50; G06F 21/56; H04L 63/14
See application file for complete search history.

(56) References Cited

U.S. PATENT DOCUMENTS

2015/0178497 A1* 6/2015 Lukacs .................. G06F 9/461
726/23

OTHER PUBLICATIONS

"NSX endpoint" available at: https://pubs.vmware.com/NSX-6/index.jsp?topic=%2Fcom.vmware.nsx.install.doc%2FGUID-62B22E0CABAC-42D8-93AA-BDFCD0A43FEA.html; retrieved from internet on Jun. 25, 2015; 2 pgs.

(Continued)

*Primary Examiner* — Izunna Okeke
(74) *Attorney, Agent, or Firm* — Loza & Loza, LLP

(57) ABSTRACT

Techniques for security scanning of containers executing within VMs. A virtualization system maintains container disk files that store data for containers. The container disk files are stored separate from, and not included within, virtual machine disk files that store data for the virtual machines. To scan data for any particular container, a scanning module scans the container disk file associated with the container. If a threat is found, a container scan catalog is updated to indicate this fact. A container may be disconnected from the network if identified security threats cannot be removed from the container. An entire VM may be disconnected from the network if all containers within the VM have threats that cannot be cleaned. The use of container disk files for security threat scanning allows for data for individual containers to be scanned.

20 Claims, 5 Drawing Sheets

(56) References Cited

OTHER PUBLICATIONS

"Offline VMDK scan," available at http://www.mcafee.com/in/products/virusscan-enterprise-for-offline-virtual-images.aspx; retrieved from internet on Jun. 25, 2015; 1 pg.
"VMware + Containers = Containers without Compromise," available at: http://blogs.vmware.com/cto/vmware-containers-containers-without-compromise/; retrieved from internet on Jun. 25, 2015; 6 pgs.
"VMware and Docker—Better Together," available at http://blogs.vmware.com/cto/vmware-docker/better-together/; retrieved from internet on Jun. 25, 2015; 6 pgs.

* cited by examiner

| Container Scan Catalog 204 |||
| --- | --- | --- |
| Container ID | VM of Container | Container Threat Status |
| 1 | 1 | No Threat |
| 2 | 1 | No Threat |
| 3 | 1 | No Threat |
| 4 | 1 | Threat Detected |
| 1 | 2 | Threat Detected |
| 2 | 2 | Threat Detected |
| 3 | 2 | Threat Detected |
| 4 | 2 | Threat Detected |

CONTAINER DATA OFFLINE AND ONLINE SCAN IN A CLOUD ENVIRONMENT

RELATED APPLICATIONS

This application is a continuation of U.S. patent application Ser. No. 14/828,549 (granted as U.S. Pat. No. 9,961,098), which claimed benefit under 35 U.S.C. 119(a)-(d) to Foreign Application Serial No. 3233/CHE/2015 filed in India on Jun. 26, 2015, both of which are incorporated herein by reference.

BACKGROUND

Recently, the use of application containers has become an increasingly popular way of executing applications on a host computer. A container provides for the isolation of a group of processes from the others on an operating system. By making use of existing operating system functionality (such as Linux name spaces), containers maintain their own private view of the operating system, file system structure, and network interfaces. Containers share the operating system kernel with other processes, but can be constrained to some extent to use an amount of resources such as the central processing unit (CPU), random access memory (RAM), or input/output (I/O) devices. Containers have proven advantageous because they typically have a small system "footprint." That is, containers provide a relatively thin encapsulation layer above and beyond any applications contained therein. Thus, instantiation and deployment of containers is relatively quick.

Security scanning involves scanning system or application files for viruses, malware, or other threats. Because disk data for virtual machines are stored in virtual machine disk files, security scanning at least partially involves scanning the virtual machine disk files. Further, because virtual machines may execute containers, if security scanning for containers is desired, then the virtual machine disk file is scanned. Unfortunately, if scanning for a single container or only a few containers is desired, then an entire virtual machine disk file is scanned. Because this may result in a large amount of unnecessary scanning, which would waste computing resources, it would be advantageous if scanning could be performed in a more efficient manner.

SUMMARY

One or more embodiments disclosed herein provide a method for scanning security threats within a container. The method includes receiving a request to perform a scan for security threats within a container executing within a virtual machine, wherein the container comprises an operating system-isolated group of processes. The method also includes identifying a container disk file associated with the container, wherein the container disk file is not included within a virtual machine disk file associated with the virtual machine and is separate from other container disk files associated with other containers executing within the virtual machine. The method further includes performing the scan on the container disk file to detect security threats. The method also includes updating a container scan catalog based on whether a threat is detected in the container disk file.

Further embodiments of the present disclosure include a non-transitory computer-readable storage medium that includes instructions that enable a processing unit to implement one or more of the methods set forth above as well as a computer system that performs the steps.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

FIG. 3 illustrates container scan catalog in more detail, according to an example.

DETAILED DESCRIPTION

Figure 1:
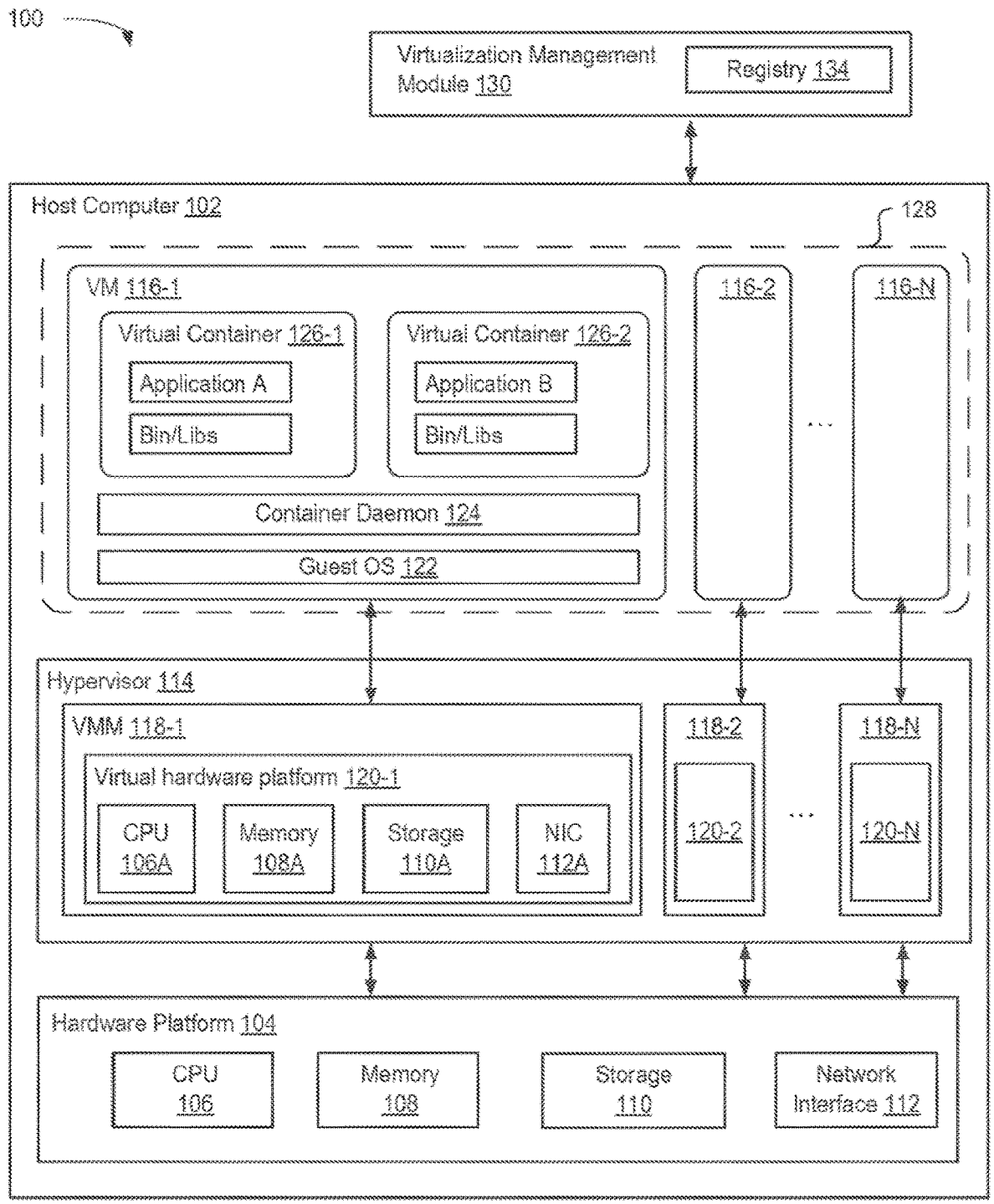
FIG. 1 is a block diagram that illustrates a computing system with which one or more embodiments of the present disclosure may be utilized.

FIG. 1 is a block diagram that illustrates a computing system 100 with which one or more embodiments of the present disclosure may be utilized. As illustrated, computing system 100 includes at least one host computer 102. Although a single host is depicted in FIG. 1, it is recognized that computing system 100 may include a plurality of host computers 102, which can be arranged in an interconnected server system such as a data center.

Host 102 is configured to provide a virtualization layer that abstracts computing resources of a hardware platform 104 into multiple virtual machines (VMs) 116 that run concurrently on the same host 102. Hardware platform 104 of host 102 includes CPU 106, memory 108, storage 110, networking interface 112, and other conventional components of a computing device. VMs 116 run on top of a software interface layer, referred to herein as a hypervisor 114, that enables sharing of the hardware resources of host 102 by the virtual machines. One example of hypervisor 114 that may be used in an embodiment described herein is a VMware ESXi™ hypervisor provided as part of the VMware vSphere® solution made commercially available from VMware, Inc of Palo Alto, Calif. Hypervisor 114 provides a device driver layer configured to map physical resource of hardware platforms 104 to "virtual" resources of each VM 116 such that each VM 116-1 to 116-N has its own corresponding virtual hardware platform (e.g., a corresponding one of virtual hardware platforms 120-1 to 120-N). Each such virtual hardware platform 120 provides emulated hardware (e.g., memory 108A, processor 106A, storage 110A, network interface 112A, etc.) that may, for example, function as an equivalent, conventional hardware architecture for its corresponding VM 116. Virtual hardware platforms 120-1 to 120-N may be considered part of virtual machine monitors (VMMs) 118-1 to 118-N which implement virtual system support to coordinate operations between hypervisor 114 and corresponding VMs 116-1 to 116-N.

Hypervisor 114 may run on top of a host operating system of host 102 or directly on hardware components of host 102. Each VM 116 includes a guest operating system 122 (e.g., Microsoft Windows®, Linux™) and one or more guest applications and processes running on top of guest operating system 122.

In one or more embodiments, each VM 116 includes a container daemon 124 installed therein and running as a guest application under control of guest OS 122. Container daemon 124 is a process that enables the deployment and management of virtual instances (referred to interchangeably herein as "containers" or "virtual containers") by providing a layer of operating-system-level virtualization on guest OS 122 within VM 116. Containers are software instances that enable virtualization at the operating system level. That is, with containerization, the kernel of an operating system that manages a host computer is configured to provide multiple isolated user space instances. These instances, referred to as containers, appear as unique servers from the standpoint of an end user that communicates with the containers. However, from the standpoint of the operating system that manages the host computer on which the containers execute, the containers are user processes that are scheduled and dispatched by the operating system. Examples of a container daemon include the open-source Docker platform made available by Docker, Inc. and Linux Containers (LXC).

In one or more embodiments, container daemon 124 is configured to utilize resource isolation features of guest OS 122 to permit multiple virtual containers 126 (e.g., containers 126-1 and 126-2) to run within a single virtual machine. For example, in cases where guest OS 122 includes a Linux™ kernel, container daemon 124 may use features such as kernel namespaces to isolate a container's view of guest OS 122, including process and user IDs, process trees, and mounted file systems, and the Control Groups (or "cgroups") feature to isolate virtual CPU 106A, virtual RAM 108A, storage 110A, and networking (112A) resources. In some embodiments, container daemon 124 executes system calls and requests operating system services and VM resources from guest OS 122. Guest OS 122 allocates virtual resources to container daemon 124, which correspond to physical computing resources (such as physical memory in RAM 108). The physical resources are allocated by hypervisor 114 that manages the execution of VM 116, as well as all other virtual machines executing within the particular host computer on which VM 116 runs.

In one embodiment, each VM 116 is configured to run one or more virtual containers 126 therein. A virtual container 126 may be instantiated on a VM by container daemon 124. Each virtual container (e.g., 126-1) runs as an isolated process in userspace on guest OS 122, sharing the kernel of guest OS 122 with other virtual containers (e.g., 126-2). Each virtual container 126 may be a package (sometimes referred to as an "image") of pre-installed application code and any binaries and libraries used for the execution of that application code to create a virtualized application. In some cases, virtual container 126 may be a blank image into which applications may be installed or launched within. As depicted in FIG. 1, VM 116-1 includes a first virtual container 126-1 having application code for Application A and its associated binaries and libraries, and a second virtual container 126-2 having application code for Application B and its associated binaries and libraries. According to one or more embodiments, container daemon 124 communicates with local (or remote) processes according to a client/server model. For example, a client process (e.g., a system administration process) may transmit a request to container daemon 124 to deploy a new container or to update an already existing container, for example, by installing a new application within the container. Further, another client process may transmit a request to container daemon 124 to quiesce or destroy a container.

Computing system 100 includes virtualization management module 130 that may communicate with the one or more hosts 102. Virtualization management module 130 is configured to carry out administrative tasks for computing system 100, including managing hosts 102, managing VMs running within each host 102, provisioning VMs, migrating VMs from one host to another host, and load balancing between hosts 102. In one embodiment, virtualization management module 130 is a computer program that resides and executes in a central server, which may reside in computing system 100, or alternatively, running as a VM in one of hosts 102. One example of virtualization management module 130 is the vCenter Server® product made available from VMware Inc.

For any particular virtual machine 116, the corresponding virtual storage 110A is represented in hardware storage 110 as a virtual machine disk file (or "VMDK," not shown in FIG. 1). Hypervisor 114 reads and writes data for any particular virtual machine 116 to its corresponding VMDK. In the past, this activity would include reading and writing data to a VMDK for all virtual containers 126 within the VMDK. However, such a scheme has drawbacks for certain tasks, such as performing security scanning (e.g., scanning for viruses and malware). More specifically, because data for all containers executing in a virtual machine are included in the VMDK, a security scan for any particular container involves scanning the entire VMDK. This means that if security scanning is desired for only one container or a subset of containers executing in a VM 116, then generally, an entire VMDK had to be scanned in the past. Techniques are thus provided herein to allow for more granular scanning of storage data for containers.

Figure 2:
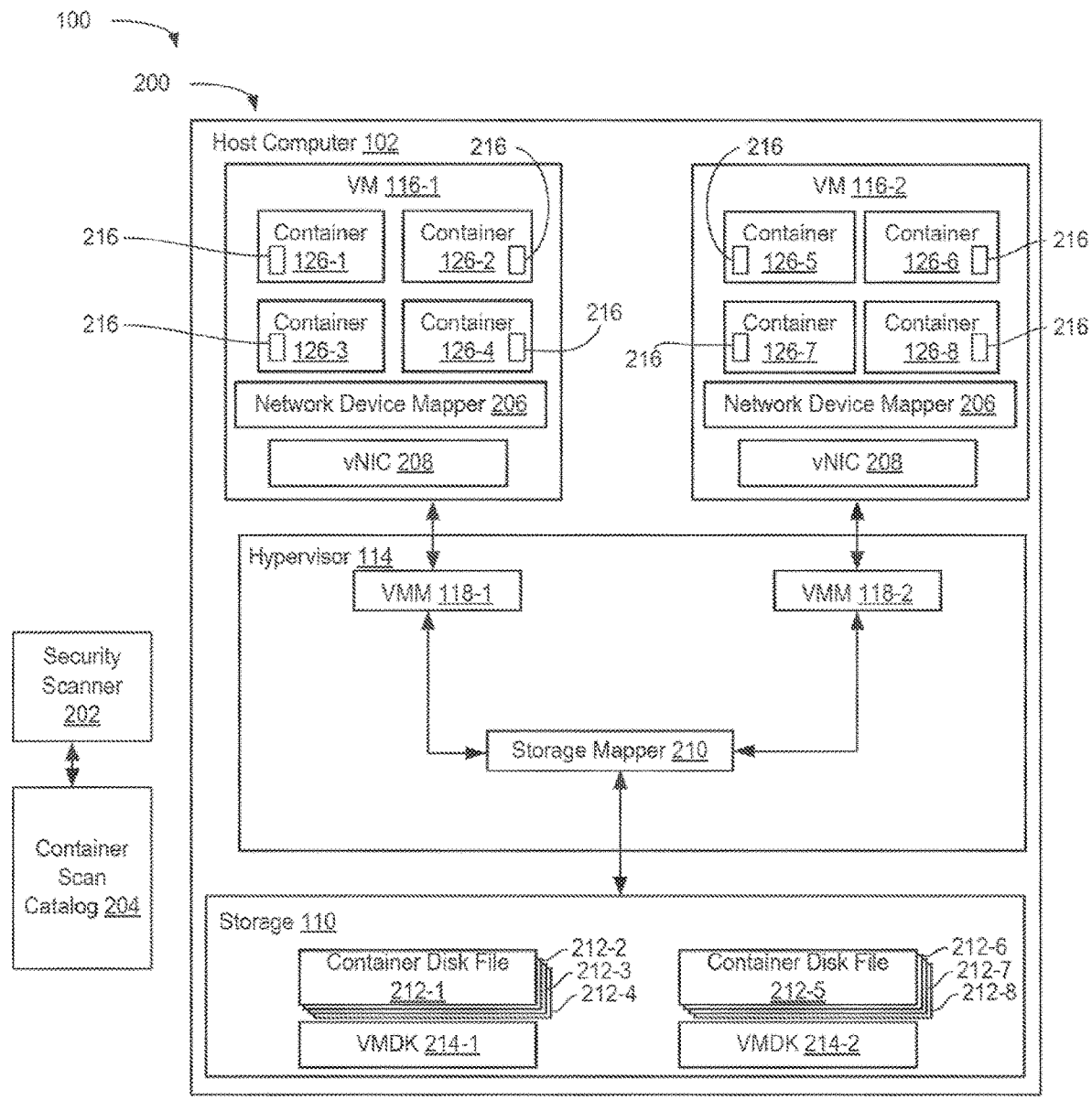
FIG. 2 is a block diagram of a scanning system, according to an embodiment.

FIG. 2 is a block diagram of a scanning system 200, according to an embodiment. Scanning system 200 is implemented by computing system 100 of FIG. 1. For clarity of explanation, FIG. 2 omits certain components of computing system 100 of FIG. 1 in order to illustrate the scanning techniques described herein. It should therefore be understood that the components illustrated in FIG. 1 and not shown in FIG. 2 may be included in scanning system 200 illustrated in FIG. 2 nonetheless.

Scanning system 200 includes a host computer 102 coupled to a security scanner 202 and a container scan catalog 204. As with computer system 100 of FIG. 1, hardware of host computer 102 executes a hypervisor 114. Hypervisor 114 executes one or more virtual machine monitors 118, which coordinate operations for the different VMs 116. Storage 110 stores data for the different VMs 116. Security scanner 202 scans data files stored in storage 110 for security threats such as viruses, and updates container scan catalog 204 based on such searches. Note that security scanner 202 may be executed by host computer 102 illustrated in FIG. 2 or by any other computer system, and may be communicatively linked to host computer 102 via networking fabric 217, which may include appropriate hardware and software networking appliances such as the NSX Edge™ services gateway available from VMware, Inc. of Palo Alto, Calif. Similarly, the container scan catalog 204 may be stored in storage 110 or in any other storage device that is communicatively linked to host computer 102 via networking components. Although the scanning system 200 is described as including one host computer 102, two VMs 116, one hypervisor 114, one storage element 110, and the like, other numbers of such elements may be included in a scanning system 200. In one example, the scanning system 200 may include two host computers 102. In another example, VMs 116 may be executing a different number of containers 126 such as three or five instead of four.

VMMs 118 executed by hypervisor 114 interface with a network device mapper 206 and with a storage mapper 210 for providing networking functionality and storage functionality to VMs 116 and containers 126. Network device mapper 206 maps communications conducted via virtual network interface controller ("vNIC") 208 to particular containers 126 executing in VMs 116 based on routing information included in the communications. For example, a network device mapper 206 may map a first communication received by VM 116-1 to a first container 126-1 and a second communication received by VM 116-1 to a second container 126-2. VNICs 208 are virtual network devices that simulate physical network interface controllers and communicatively link VMs 116 with a network fabric. As shown, computer system 100 may include one vNIC 208 per VM 116 or may include other numbers of vNICs 208. Storage mapper 210 maps storage requests (e.g., reads and writes) to particular files within storage 110, based at least in part on which container 126 and/or which VM 116 the storage request is received from.

To allow for security scanning of data for individual containers 126, storage mapper 210 creates, writes to, and reads from a container disk file 212 within storage 110 for each container 126. More specifically, when a container 126 is created, storage mapper 210 creates a new container disk file 212 for that container 126. All data for container 126 is stored within its corresponding container disk file 212. Each container disk file 212 thus includes data for a single container 126 and for no other containers 126. For example, container disk file 212-1 may contain data for container 126-1 but for no other container. Similarly, container disk file 212-2 may contain data for container 126-2 but for no other container. Each container disk file 212 is separate from, and thus not contained within, the VMDK for the VM executing container 126 associated with container disk file 212. Storage mapper 210 maps accesses associated with containers 126, such as reads and writes, to the appropriate container disk file. For example, storage mapper 210 maps read accesses for a particular container 126 to an associated container disk file 212, and maps write accesses for a particular container 126 to an associated container disk file 212.

Because container disk files 212 are storage files that are separate for each container 126, security scanner 202 is able to individually scan data for each container 126. This ability is in contrast with prior art systems, in which all data for containers were stored in a single monolithic VMDK and in which performing security scanning required scanning an entire VMDK and thus data for all containers executed by the associated VM.

Security scanner 202 may scan container disk files 212 in an online mode and in an offline mode. The term "online" refers to a scan while a container 126 is executing and the term "offline" refers to a scan while a container 126 is not executing. Note that even if a VM 116 in which a particular container is resident is online, if the container itself is offline, then scans for that container are considered to be "offline" scans. For offline scans, security scanner 202 scans container disk files 212 directly. Online scans are conducted by security scanner 202 in conjunction with a scanning agent 216 that executes within the containers. Examples of security scanners are Symantec Endpoint Protection available from Symantec Corporation of Sunnyvale, Calif. and McAfee Endpoint Protection available from McAfee, Inc. of Santa Clara, Calif. While scanning, scanning agents 216 account for changes that may be made to container disk files 212 while containers 126 are operational.

If security scanner 202 detects a security threat such as a virus in a container disk file 212, security scanner 202 attempts to remove the security threat from container disk file 212. If scanning is complete and security threats are unable to be removed, then security scanner 202 updates container scan catalog 204 to indicate that container 126 has a threat that has not been removed. However, if the scan has completed and either no threats were found or one or more threats were found but all threats found have been cleared, then security scanner 202 updates container scan catalog 204 to indicate that container 126 includes no threats that have not been cleared. Thus, container scan catalog 204 stores information that indicates whether the various container disk files 212 have security threats that cannot be cleared.

After scanning, security scanner 202 reads container scan catalog 204 to determine which containers 126 have threats that cannot be cleared. Network device mapper 206 disconnects, from network fabric 217, containers 126 that have threats that cannot be cleared. For virtual machines 116 where fewer than all containers 126 executing within virtual machine 116 have threats that cannot be cleared, network device mapper 206 unmaps those containers 126 from network fabric 217. The result of such unmapping is that no communications may be directed to an unmapped container 126 via network fabric 217 and no communications from unmapped containers 126 may be transmitted to another entity via network fabric 217. For virtual machines 116 where all containers 126 executing within virtual machine 116 have threats that cannot be cleared, network device mapper 206 disconnects vNIC 208 for VM 116 from network fabric 217. With the vNIC disconnected in this manner, no communications are possible between VM 116 and other entities on network fabric 217.

Note that while container disk file 212 files contain data for respective containers 126, a VMDK 214 is still present in storage 110 and stores data for the portion of VMs 116 not directly involved with containers 126. For example, while container disk files 212 store instructions and data that define containers 126, VMDKs 214 store instructions and data for guest OS 122 (FIG. 1), container daemon 124 (FIG. 1), and other components of VM 116 not directly considered to be a part of containers 126. This division provides for advantageous security threat scanning by security scanner 202.

FIG. 3 illustrates container scan catalog 204 in more detail, according to an example. Container scan catalog 204 stores scan catalog entries 302. In the embodiment shown, each scan catalog entry 302 includes a container identifier, an identifier of the VM in which the container resides, and the threat status for the container, which can indicate either that a threat exists in the container or that no threat exists. In various embodiments, other information may be included in container scan catalog 204, such as an indication of the number of containers in each VM included in container scan catalog 204, whether threat cleaning was attempted, a specific indication that all containers 126 in a particular VM have security threats, and other information.

Figure 4:
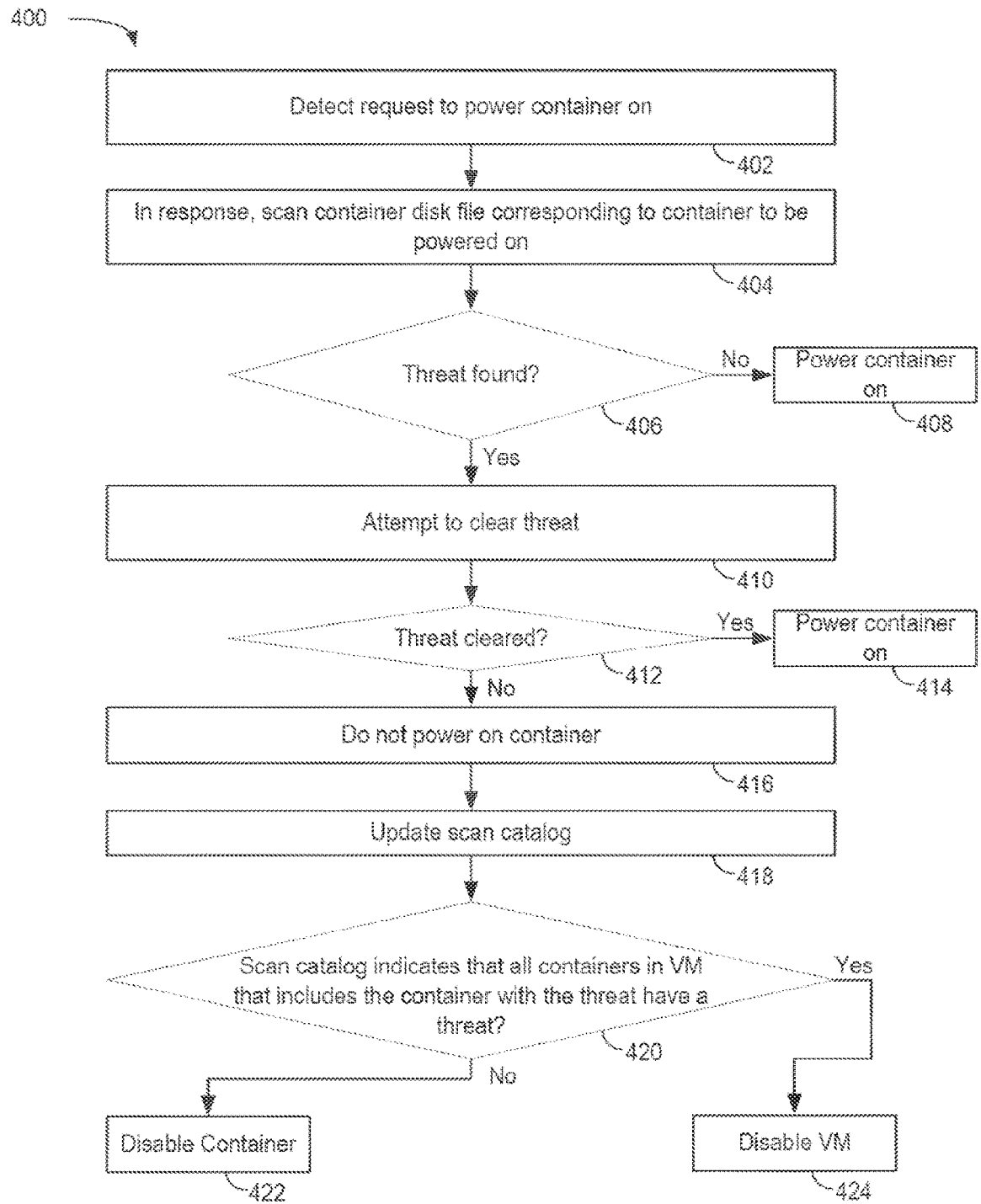
FIG. 4 is a flow diagram that illustrates steps for a method of scanning containers in an offline mode, according to an example.

FIG. 4 is a flow diagram that illustrates steps for a method 400 of scanning containers 126 in an offline mode, according to an example. It should be recognized that, even though the method is described in conjunction with the system of FIGS.

1-3, any system configured to perform the method steps, in any technically feasible order, is within the scope of the present disclosure.

As shown, a method 400 begins at step 402, where security scanner 202 detects a request to power on a container 126. This request may be received from software elements executing within VM 116, from virtualization management module 130, or from other components shown or not shown. At step 404, security scanner 202 scans a container disk file 212 corresponding to the container to be powered on. To perform this scan, security scanner 202 retrieves data stored in the container disk file 212 and analyzes it to identify threats within that data. The scan involves searching for security threats such as viruses or malware. Scanning can be performed by known threat scanning software such as software from Trend Micro™ of Tokyo, Japan. Note that because security scanner scans a container disk file 212 in response to receiving a request to power on a container 126, the request to power on a container 126 may be considered herein to be a request to perform a scan.

At step 406, security scanner 202 determines whether a threat is found within the container disk file that is scanned. If a threat is not detected, then the method proceeds to step 408 and if a threat is detected, then the method proceeds to step 410. At step 408, because no threat is detected, security scanner 202 allows the container corresponding to the scanned container disk file to power on. At step 410, because a threat is detected, security scanner 202 attempts to clear the threat from the scanned container disk file.

At step 412, security scanner 202 determines whether clearing the threat has succeeded. If the threat is successfully cleared, then the method proceeds to step 414 and if the threat is not successfully cleared, then the method proceeds to step 416. At step 414, security scanner 202 causes the container corresponding to the scanned container disk file to be powered on. At step 416, security scanner 202 causes the container to not be powered on.

At step 418, security scanner 202 updates container scan catalog 204 to indicate that the container corresponding to the scanned container disk file includes a threat for which removal failed. At step 420, security scanner 202 determines whether container scan catalog 204 indicates that all containers 126 in a particular VM 116 have a threat for which removal failed. If not all containers 126 in a VM 116 have a threat for which removal failed, then the method proceeds to step 422 and if all containers 126 in a VM 116 have a threat for which removal failed, then the method proceeds to step 424.

At step 422, security scanner 202 disables the container corresponding to the scanned container disk file. This disabling is done by removing the container from network fabric 217, by unmapping the container from a vNIC 208 for the VM in which the container executes. This unmapping means that communications are not transmitted to or from the unmapped container.

At step 424, security scanner 202 disables the VM in which the container is executing. Disabling the VM is done by reconfiguring the vNIC to disconnect the vNIC from networking fabric 217.

Figure 5:
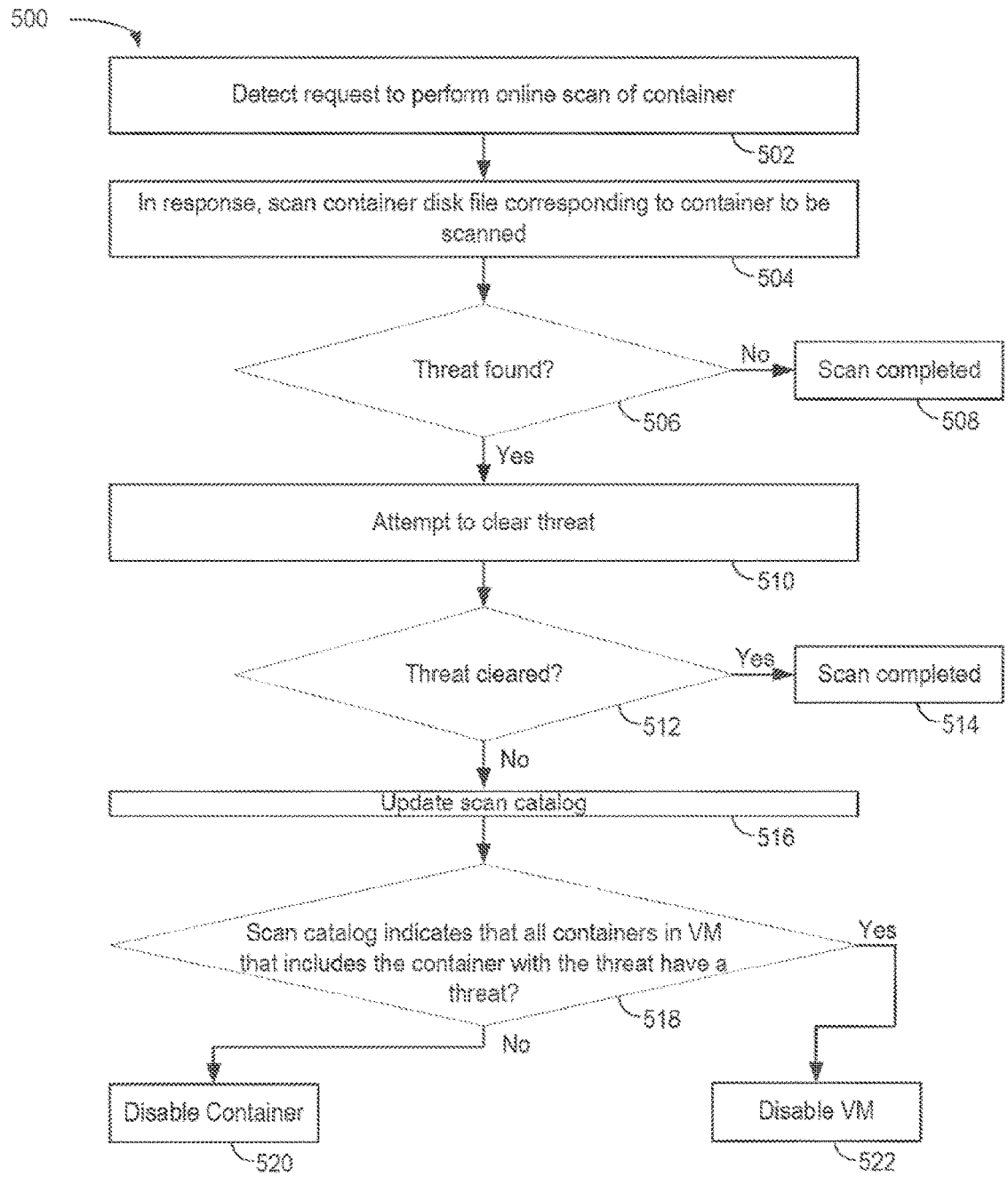
FIG. 5 is a flow diagram that illustrates steps for a method of scanning containers in an online mode, according to an example.

FIG. 5 is a flow diagram that illustrates steps for a method 500 of scanning containers 126 in an online mode, according to an example. It should be recognized that, even though the method is described in conjunction with the system of FIGS. 1-3, any system configured to perform the method steps, in any technically feasible order, is within the scope of the present disclosure.

As shown, a method 500 begins at step 502, where security scanner 202 detects a request to perform an online scan of a container 126. At step 504, security scanner 202, in response to detecting the request to perform the online scan, and in conjunction with scanning agent 216 (within the container for which a scan is requested), scans a container disk file 212 corresponding to the container for which a scan is requested.

At step 506, security scanner 202, via scanning agent 216, determines whether a threat is found within the container disk file 212. If a threat is not found, then the method proceeds to step 508, where the scan is completed and no further action is taken. If a threat is found at step 506, then the method proceeds to step 510. At step 510, security scanner 202, via scanning agent 216, attempts to clear the threat.

At step 512, security scanner 202, via scanning agent 216, determines whether the threat has been cleared. If the threat has been cleared, then the method proceeds to step 514, and if the threat has not been cleared, then the method proceeds to step 516. At step 514, the scan is completed and no further action is taken. At step 516, if the threat is not cleared, then security scanner 202 updates container scan catalog 204 to indicate that the scanned container has a threat that cannot be cleared.

At step 518, security scanner 202 determines whether all containers 126 in the VM that includes the scanned container have threats that could not be cleared. If not all such containers 126 have threats that could not be cleared, then the method proceeds to step 520 and if all such containers 126 have threats that could not be cleared, then the method proceeds to step 522. At step 520, security scanner 202 disables the scanned container by unmapping the container in the network device mapper 206 so that no communications may be transmitted to or from the container. At step 522, security scanner 202 disables the VM 116 that executes the container by reconfiguring the vNIC associated with the VM.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method, comprising:
receiving a request to perform a scan for security threats within a virtual container among a plurality of virtual containers that have been instantiated and executing within a virtual machine (VM), wherein each of the virtual containers provides a layer of operating-system-level virtualization on an operating system within the VM;
identifying a container disk file associated with the virtual container among a plurality of container disk files associated with different virtual containers of the plurality of virtual containers, wherein each of the container disk files includes data for one virtual container of the plurality of virtual containers and wherein each of the container disk files is a separate file and not included within a virtual machine disk file associated with the VM;
performing the scan on the container disk file to detect security threats; and
updating a container scan catalog based on whether a threat is detected in the container disk file.

2. The method of claim 1, further comprising:
detecting a threat within the virtual container,
wherein updating the container scan catalog comprises including an indication in the container scan catalog that the virtual container includes the threat.

3. The method of claim 1, further comprising:
detecting a threat within the virtual container;
attempting to clean the threat,
wherein if the threat is cleaned, then updating the container scan catalog comprises updating the scan catalog to include an indication that the virtual container has no threats, and
wherein if the threat is not cleaned, then updating the container scan catalog comprises updating the scan catalog to include an indication that the virtual container has a threat.

4. The method of claim 1, wherein:
the scan comprises an offline scan, and
the method further comprises performing the scan in response to detecting a request to start the virtual container.

5. The method of claim 1, wherein:
the scan comprises an online scan that is performed while the virtual container is executing.

6. The method of claim 5, wherein:
the scan is performed by a scanning agent executing within the virtual container.

7. The method of claim 1, further comprising:
detecting a threat within the virtual container; and
in response, detaching the virtual container from a virtual network fabric associated with the VM.

8. The method of claim 1, further comprising:
determining that the container scan catalog indicates that all virtual containers within the VM have a threat; and
disabling the VM in response to a determination that all virtual containers within the VM have a threat.

9. The method of claim 7, wherein detaching the virtual container from the virtual network fabric comprises unmapping the virtual container from a virtual network interface controller.

10. The method of claim 1, wherein the container disk file comprises a file that stores virtualized disk data for the virtual container and that is stored separately from the virtual machine disk file.

11. The method of claim 1, wherein performing the scan comprises scanning the container disk file for at least one of a virus and malware.

12. A system, comprising:
a host computer configured to execute a hypervisor that is configured to manage execution of a virtual machine (VM);
a storage device configured to store a plurality of virtual machine disk files; and
a processor configured to:
receive a request to perform a scan for security threats within a virtual container among a plurality of virtual containers that have been instantiated and executing within the VM, wherein each of the virtual containers provides a layer of operating-system-level virtualization on an operating system within the VM;
identify a container disk file stored in the storage device and associated with the virtual container among a plurality of container disk files associated with different virtual containers of the plurality of virtual containers, wherein each of the container disk files includes data for one virtual container of the plurality of virtual containers and wherein each of the container disk files is a separate file and not included within a virtual machine disk file that is associated with the VM;
perform the scan on the container disk file to detect security threats; and
update a container scan catalog based on whether a threat is detected in the container disk file.

13. The system of claim 12, wherein the processor is further configured to:
detect a threat within the virtual container;
attempt to clean the threat,
wherein if the threat is cleaned, then updating the container scan catalog comprises updating the scan catalog to include an indication that the virtual container has no threats, and
wherein if the threat is not cleaned, then updating the container scan catalog comprises updating the scan catalog to include an indication that the virtual container has a threat.

14. The system of claim 12, wherein the processor is further configured to:
detect a threat within the virtual container; and
in response, detach the virtual container from a virtual network fabric associated with the virtual machine.

15. The system of claim 12, wherein the processor is further configured to:
determine that the container scan catalog indicates that all virtual containers within the virtual machine have a threat; and
disable the virtual machine in response to a determination that all virtual containers within the VM have a threat.

16. The system of claim 12, wherein container disk file comprises a file that stores virtualized disk data for the virtual container and that is stored separately from the virtual machine disk file.

17. A non-transitory computer-readable medium storing instructions that, when executed by a processor, cause the processor to perform a method, the method comprising:
receiving a request to perform a scan for security threats within a virtual container among a plurality of virtual containers that have been instantiated and executing within a virtual machine (VM), wherein each of the virtual containers provides a layer of operating-system-level virtualization on an operating system within the VM;
identifying a container disk file associated with the virtual container among a plurality of container disk files associated with different virtual containers of the plurality of virtual containers, wherein each of the container disk files includes data for one virtual container of the plurality of virtual containers and wherein each of the container disk files is a separate file and not included within a virtual machine disk file associated with the VM;
performing the scan on the container disk file to detect security threats; and
updating a container scan catalog based on whether a threat is detected in the container disk file.

18. The non-transitory computer-readable medium of claim 17, wherein the method further comprises:
detecting a threat within the virtual container;
attempting to clean the threat,
wherein if the threat is cleaned, then updating the container scan catalog comprises updating the scan catalog to include an indication that the virtual container has no threats, and
wherein if the threat is not cleaned, then updating the container scan catalog comprises updating the scan catalog to include an indication that the virtual container has a threat.

19. The non-transitory computer-readable medium of claim 17, wherein the method further comprises:
detecting a threat within the virtual container; and
in response, detaching the virtual container from a virtual network fabric associated with the virtual machine.

20. The non-transitory computer-readable medium of claim 17, wherein the method further comprises:
determining that the container scan catalog indicates that all virtual containers within the virtual machine have a threat; and
disabling the VM in response to a determination that all virtual containers within the VM have a threat.

* * * * *